July 16, 1940.  L. H. KRUTSCH  2,208,325
HOLDING DEVICE FOR BALL AND SOCKET JOINTS
Filed Sept. 17, 1938
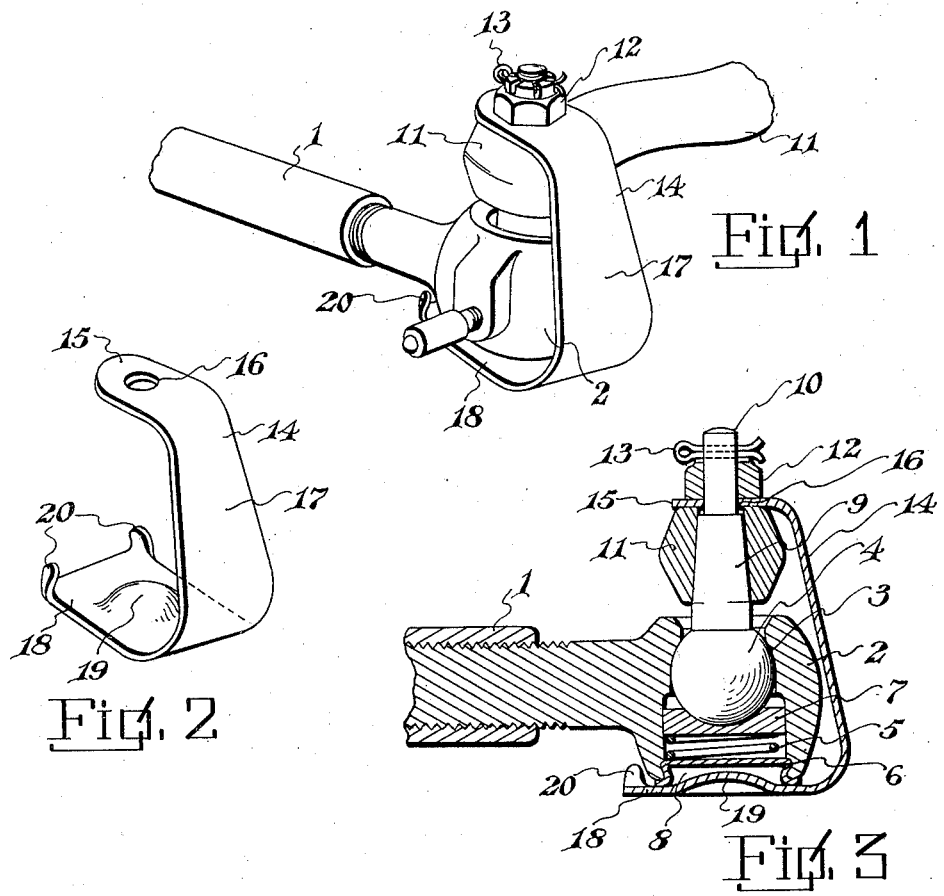
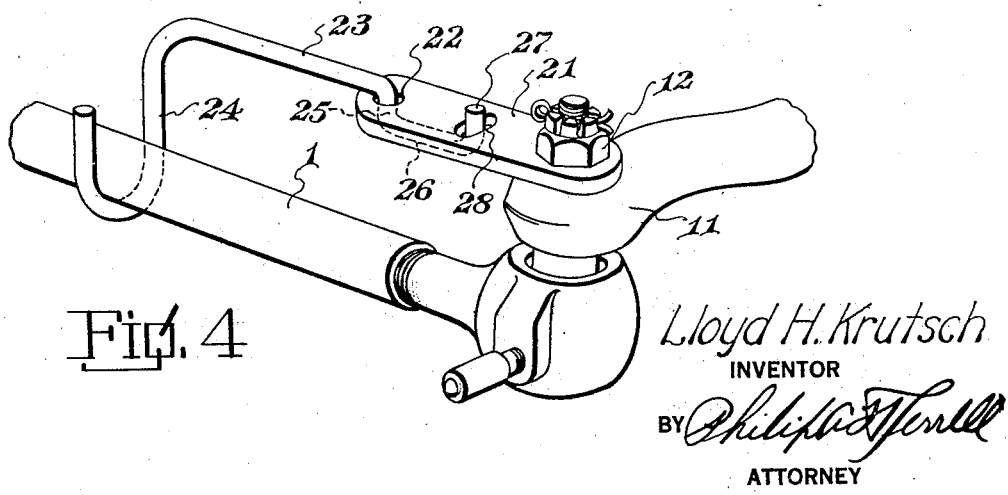
Lloyd H. Krutsch
INVENTOR
BY *Philip W. Ferrell*
ATTORNEY Patented July 16, 1940

2,208,325

UNITED STATES PATENT OFFICE 2,208,325

HOLDING DEVICE FOR BALL AND SOCKET JOINTS

Lloyd H. Krutsch, Tulsa, Okla., assignor of one-half to Gus H. Schwickrath, Tulsa, Okla.

Application September 17, 1938, Serial No. 230,499

1 Claim. (Cl. 287—90)

The invention relates to holding devices for ball and socket joints, and has for its object to provide means cooperating with both elements of the joint for maintaining the same in normal relative position and against separation in case of wear on either element.

A further object is to form a U-shaped clip for holding the socket elements together and to construct the clip so its arms will be anchored to both elements and maintain the same in normal position and against separation in the case of wear.

A further object is to provide the lower arm of the spring clip with an upwardly extending portion received in the chamber of the under side of the socket portion of the joint for preventing displacement laterally of the arm during the operation of the joint.

A further object is to provide the end of the lower arm with lugs adapted to spring over the under side socket and prevent lateral displacement of the lower end of the clip.

A further object is to provide a U-shaped spring clip which may be easily and quickly applied to a conventional form of knuckle joint of the steering mechanism type, without varying the construction thereof, and constructed in a manner whereby the ball and socket joint elements will be normally spring pressed towards each other for preventing the separation of the elements in case of wear in the joints.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of a conventional form of knuckle joint of the type used in connection with motor vehicles, and showing the clip applied thereto.

Figure 2 is a perspective view of the clip.

Figure 3 is a vertical longitudinal sectional view through the joint and clip.

Figure 4 is a perspective view of a modified form of joint holder, showing the same applied to a joint and knuckle joint shaft.

Referring to the drawing and particularly to Figures 1 to 3 inclusive, the numeral 1 designates the tie rod, which terminates in a socket 2 having a seat 3 therein. Rockably mounted in the socket seat 3 is a ball 4, known as a knuckle joint. The ball 4 is forced upwardly against its seat 3 by an expansion spring 5 interposed between the closure cap 6 and the follower plate 7. It will be noted that the closure cap 6 is provided with a chamber 8. Extending upwardly from the ball 4 is a tapered shaft 9, which terminates, at its upper end, in a threaded shaft 10, on which is received the knuckle arm 11 in the usual manner. The knuckle arm is held on the tapered shaft 9 by means of a castillated nut 12, which nut is held against rotation by means of a cotter key 13.

It has been found that many serious accidents occur from worn out knuckle joints, which become so badly worn in the socket 2 that the tie rod 1 with the socket drops away from the ball, thereby rendering the steering mechanism inoperative and allowing vehicles to run wild. The same condition exists in the drag link of the steering mechanism of a vehicle and the device hereinafter set forth may be used in connection with any type of ball and socket joint.

The ball and socket are held in engagement by means of a U-shaped spring clip 14, one arm 15 of which is provided with an aperture 16 through which the threaded shaft 10 extends, and it will be seen that the nut 12 will securely anchor the upper end of the spring clip 14 in position so it will move with the knuckle arm 11 during a steering operation. The portion 17 of the clip extends downwardly and outwardly and terminates at its lower end in an inwardly extending arm 18 beneath the socket 2 and is provided with an upwardly convexed dome 19.

When the clip is forced into position the dome 19 will be received in the chamber 8 of the closure cap 6 and by the spring action of the clip will hold the clip against lateral displacement. In some types of ball and socket joints the lower end of the socket 2 is flat and in this type the spaced guide lugs 20 will prevent the lower end of the clip from becoming displaced. It will be noted that the guide lugs 20, when the clip is forced into position, will pass to opposite sides of the socket 2 and spring over the same, and at the same time properly guide the dome 19 to its position within the chamber 2 of the closure cap 6. When the device is in position on the joint it is obvious upon development of wear in the socket or on the ball, the joint will be maintained assembled, thereby preventing accidents, and where the device is placed on the joint, when the joint is initially placed in use, there is no danger of the upper end of the socket becoming worn or the ball passing through the upper end thereof.

Referring to the modified form shown in Figure 4, in this form an arm 21 is securely clamped between the nut 12 and the knuckle arm 11. Arm 21 extends outwardly over the tie rod and is provided with an aperture 22 for the reception of the spring steel supporting arm 23. The arm 23 terminates in a downwardly extending U-shaped hook 24, which hooks under the tie rod 1 and exerts an upward pressure thereon for maintaining and supporting the socket 2 in relation to the ball 4. The inner end of the arm 23 is provided with a downwardly extending portion 25, which extends through the aperture 22 and the portion 25 terminates in an inwardly extending arm 26 engaging the under side of the arm 21. Arm 26 terminates in an upwardly extending arm 27, which extends through a transversely elongated aperture 28 in the arm 21, therefore it will be seen that the arm 21 may have limited movement.

The movement of the arm 21 is limited to a very small range with the knuckle arm 11 during a steering operation, hence it will be seen that the spring supporting arm 23 will exert an upward pressure on the tie rod 1 at all times, even though there is a limited movement.

From above it will be seen that a safety clip is provided for ball and socket joints and knuckle joints, commonly used in connection with steering mechanisms of motor vehicles.

The invention having been set forth what is claimed as new and useful is:

The combination with a ball and socket joint, of a clip arching said joint, said clip having an arm anchored to the ball element of the joint and normally forcing the same towards the socket, said clip having an arm engaging the outer side of the socket element of the joint and normally forcing the same towards the ball a dome shaped extension carried by the last named arm and disposed in a chamber in the outer side of the socket and spaced guide lugs carried by the end of said last named arm and positioned to spring past the opposite sides of the socket.

LLOYD H. KRUTSCH.